US009980433B2

(12) United States Patent
Duquesne et al.

(10) Patent No.: US 9,980,433 B2
(45) Date of Patent: May 29, 2018

(54) CLEANING ASSEMBLY FOR A HARVESTER

(71) Applicant: CNH Industrial America LLC, New Holland, PA (US)

(72) Inventors: Frank R. G. Duquesne, Zwevegem (BE); Bart M. A. Missotten, Herent (BE); Tom N. N. Somers, Aalter (BE)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 14/915,092

(22) PCT Filed: Aug. 26, 2014

(86) PCT No.: PCT/EP2014/068019
§ 371 (c)(1),
(2) Date: Feb. 26, 2016

(87) PCT Pub. No.: WO2015/028437
PCT Pub. Date: Mar. 5, 2015

(65) Prior Publication Data
US 2016/0198629 A1    Jul. 14, 2016

(30) Foreign Application Priority Data

Aug. 27, 2013   (BE) .................................. 2013/0557

(51) Int. Cl.
*A01D 41/127*   (2006.01)
*A01F 12/44*   (2006.01)
*A01F 12/46*   (2006.01)

(52) U.S. Cl.
CPC ..... *A01D 41/1276* (2013.01); *A01D 41/1273* (2013.01); *A01F 12/444* (2013.01); *A01F 12/446* (2013.01); *A01F 12/448* (2013.01); *A01F 12/46* (2013.01)

(58) Field of Classification Search
CPC ............ A01D 41/1276; A01D 41/1273; A01F 12/444; A01F 12/46; A01F 12/448; A01F 12/446
See application file for complete search history.

(56) References Cited

U.S. PATENT DOCUMENTS

| 3,392,832 | A | | 7/1968 | Allen |
| 4,259,829 | A | * | 4/1981 | Strubbe .............. A01D 41/1276 460/1 |
| 4,821,744 | A | | 4/1989 | Turner et al. |
| 5,584,167 | A | * | 12/1996 | Hamada ................ F16H 7/0827 180/6.48 |
| 5,995,895 | A | | 11/1999 | Watt et al. |

(Continued)

FOREIGN PATENT DOCUMENTS

| DE | 3228326 A1 | 2/1984 |
| DE | 8221573 U1 | 1/1986 |

(Continued)

*Primary Examiner* — Frederick M Brushaber
(74) *Attorney, Agent, or Firm* — Patrick M. Sheldrake

(57) ABSTRACT

A cleaning assembly for a harvester operable to clean a crop while moving along a direction of the crop flow and comprising multiple cleaning sub-assemblies has a control system coupled to each of the cleaning sub-assemblies and operable to control the operation of each of the cleaning sub-assemblies in function of separate cleaning sub-assembly control settings for each of the cleaning sub-assemblies.

14 Claims, 5 Drawing Sheets

(56) References Cited

U.S. PATENT DOCUMENTS

| | | | |
|---|---|---|---|
| 6,863,604 B2 | 3/2005 | Behnke | |
| 7,322,882 B2 | 1/2008 | Duquesne et al. | |
| 7,630,808 B2 | 12/2009 | Behnke et al. | |
| 7,645,190 B2 | 1/2010 | Schwinn et al. | |
| 7,670,218 B2 | 3/2010 | Behnke et al. | |
| 7,841,931 B2 | 11/2010 | Straeter | |
| 7,846,013 B1 | 12/2010 | Diekhans | |
| 8,626,400 B2 | 1/2014 | Sheidler et al. | |
| 8,676,453 B2 | 3/2014 | Behnke et al. | |
| 9,125,346 B2 | 9/2015 | Schulz | |
| 2008/0318650 A1* | 12/2008 | Dhont | A01D 75/282 460/101 |
| 2012/0184339 A1* | 7/2012 | Schulz | A01F 12/444 460/78 |
| 2013/0029734 A1* | 1/2013 | Behnke | A01D 41/1276 460/101 |
| 2016/0192591 A1* | 7/2016 | Missotten | A01F 12/444 460/100 |
| 2016/0198629 A1* | 7/2016 | Duquesne | A01D 41/1276 701/36 |

FOREIGN PATENT DOCUMENTS

| | | |
|---|---|---|
| DE | 102011017620 A1 | 10/2012 |
| EP | 2510777 A1 | 10/2012 |
| EP | 2550851 A1 | 1/2013 |
| IT | 1132555 B | 7/1986 |
| JP | H07227137 A | 8/1995 |
| JP | H09140247 A | 6/1997 |
| JP | 2001095359 A | 4/2001 |
| JP | 2004016200 A | 1/2004 |
| JP | 2004261115 A | 9/2004 |
| JP | 2004261118 A | 9/2004 |
| JP | 2005065615 A | 3/2005 |
| JP | 2005328762 A | 12/2005 |
| JP | 2006101785 A | 4/2006 |
| JP | 2007174997 A | 7/2007 |
| JP | 2008000116 A | 1/2008 |
| JP | 2009100665 A | 5/2009 |
| JP | 20120606965 A | 3/2012 |
| WO | 8100503 A1 | 3/1981 |

* cited by examiner

CLEANING ASSEMBLY FOR A HARVESTER

This application is the US National Stage filing of International Application Serial No. PCT/EP2014/068019 filed on Aug. 26, 2014 which claims priority to Belgian Application BE2013/0557 filed Aug. 27, 2013, each of which is incorporated herein by reference in its entirety.

FIELD OF THE INVENTION

The present invention generally relates to a cleaning assembly for a harvester. More specifically a harvester, such as a combine harvester, comprising a cleaning assembly with reciprocating sieves.

BACKGROUND OF THE INVENTION

Such a cleaning assembly generally is arranged in the combine harvester below a threshing and/or separation unit for receiving crop material that is to be subjected to a cleaning operation, such as for example threshed grain from which chaff and other impurities need to be removed in order to retain cleaned grain. The cleaning assembly normally comprises a fan for generating a flow of air that cooperates with a sieve assembly comprising reciprocating sieves longitudinally extending along the direction of the crop flow. The sieves comprise openings such that when crop material is received on them, the clean grain can fall through these openings and the airflow can pass these openings for blowing impurities and chaff towards the downstream end of the sieves. The clean grain is then accumulated below the sieves at a clean grain auger from where it is for example subsequently transported to a grain tank of the harvester.

WO8100503A1 (Massey Fergusson, 1981) shows a harvester comprising a cleaning assembly comprising a plurality of fans of which the speed can be independently controlled. One of the fans 12 provides an airflow to the sieve assembly 11 shown in the Figure of WO8100503A1. Another fan 10 provides an airflow at an outlet directed at an opening that forms a fall step for the crop between the feeder 9 and the grain pan 7. It is clear that the distribution of the airflow, towards the sieves and also the local air pressure when viewed along the driving direction varies. This means that closer to the outlet of the fan 12, at the upstream side of the sieves 11 with respect to the crop flow, the airflow and air pressure will be higher than further away from the outlet at the downstream side of the sieve. The same holds for the distribution of the airflow and air pressure generated by other fan 10 with respect to the grain pan 7. The grain pan 7 not being permeable for this airflow still further enhancing this effect.

WO2005/018303A1 (Straeter, 2005) shows in its FIG. 8 an embodiment of a combine harvester that comprises two fans providing an airflow near the upstream side of the sieves of the cleaning assembly. Both fans can be controlled independently, one fan is directed to the lower sieve, the other is directed to both the upper and the lower sieve. Since the outlet of both fans is nearly at the same location with respect to the direction of the crop flow the distribution of the airflow and air pressure along the sieves will be higher than the airflow and air pressure further away from the outlet at the downstream side of the sieve.

EP2476304A1 (Claas, 2012) describes a combine harvester with a plurality of fans arranged along a direction transverse to the crop flow at the upstream side of the sieves. The blowers can be controlled independently of one another. The independent control of the air volume flow output by the fans makes it possible to vary the air flow supplied to the sieve system so that can vary across the width of the sieve system, for example, to compensate an uneven distribution of crop material on the sieves on a slope transverse to the driving direction. Although this system provides control for the distribution of the airflow towards the sieves in a direction transverse to the crop flow, which is generally referred to as the transversal direction of the cleaning system generally transverse to the longitudinal direction of the cleaning system. Furthermore the cleaning system requires a large grain pan arranged below the threshing unit and covering the distance to the outlet of the fan. In this way the area available for elements most actively involved in the cleaning operation such as the sieves of the cleaning system is reduced.

U.S. Pat. No. 4,259,829 (Sperry, 1981) describes a combine harvester comprising a cleaning system with a single fan arranged near the upstream side of the sieves. Adjustable baffles are provided in order to influence the distribution of the airflow along the longitudinal direction of the cleaning system in response to sensors detecting the distribution of the crop material on the sieves along both the longitudinal and transverse direction. However these baffles affect the efficiency of the fan system as they form an obstruction to the airflow generated by the fan. Furthermore these baffles only allow for a limited modification to the distribution of the airflow along the longitudinal direction of the sieves as in such a setup the airflow will generally always decrease towards the downstream end of the sieves.

EP2550852 (Claas, 2013) also discloses a sensor system capable of measuring the distribution of the crop material on the sieves along both the longitudinal and transverse direction.

There still remains a need for an improved cleaning assembly for a harvester that is able to augment flexibility and efficiency in controlling the cleaning operation along the direction of the crop flow and is able to make more efficient use of the available area for active cleaning elements such as for example the sieve elements which are most actively involved in the cleaning operation.

SUMMARY OF THE INVENTION

According to a first aspect of the invention, there is provided a cleaning assembly for a harvester operable to clean a crop while moving along a direction of the crop flow and comprising:
  multiple cleaning sub-assemblies, each comprising:
  a fan for generating a flow of air at a fan outlet;
  a sieve assembly comprising at least one reciprocating sieve extending along the direction of the crop flow between an upstream end and a downstream end, the upstream end being arranged near the fan outlet such that the flow of air output by the fan outlet generally flows along the sieve assembly and the direction of the crop flow; and
  a clean grain auger arranged below the sieve assembly and operable to receive cleaned grain from the sieve assembly,
  the downstream end of a first one of the multiple cleaning sub-assemblies being arranged at the upstream end of a second one of the multiple cleaning sub-assemblies,
  a control system coupled to each of the cleaning sub-assemblies and operable to control the operation of each of the cleaning sub-assemblies in function of separate cleaning sub-assembly control settings for each of the cleaning sub-assemblies.

This cleaning assembly augments flexibility in controlling the cleaning operation along the direction of the crop flow considerably as the use of multiple separately controllable cleaning sub-assemblies allow in addition to improved control of the air flow generated by the fans along the direction of the crop flow also improved control of other elements such as for example the sieve assembly. Both sub-assemblies can be separately controlled in function of the specific harvesting conditions without the need to settle to a compromise setting to cope with differing operating circumstances in an upstream region and a downstream region of the cleaning assembly. This means that the specific composition of the mixture and amount of the crop in these regions differs. As the crop travels along the direction of the crop flow grain falls through the sieve, chaff is blown downstream and other impurities traverse the sieve surface towards the downstream end of the sieve. The mixture of the crop, this means the share of grain and crop material other than grain such as chaff and other impurities, varies locally on different areas of the cleaning system in dependence of the specific harvesting conditions. It is for example possible that for certain harvesting conditions the mixture contains a larger share of material other than grain at the upstream end of the cleaning assembly than at the downstream end and that as a consequence of changing harvesting conditions the crop mixture subsequently contains a smaller share of material other than grain at the upstream end than at the downstream end. The cleaning assembly according to the invention allows to adapt its operation along different regions along the direction of the crop flow so that an optimal cleaning operation can be performed to the specific operating circumstances in these regions. Additionally such an arrangement allows for a more efficient use of the available area for active cleaning elements as each of the sub-assemblies comprises its dedicated fan and sieve assembly. Efficiency in the cleaning operation is even further enhanced as the cleaned grain from an upstream sub-assembly does not have to be transported to the clean grain auger of a subsequent downstream sub-assembly and thereby does not disturb the airflow at the outlet of the fan of this downstream sub-assembly.

According to an embodiment the control system comprises a cleaning sub-assembly control setting correlation module operable to:

receive at least one separate cleaning sub-assembly control setting;

calculate at least one further separate cleaning sub-assembly control setting from the received separate cleaning sub-assembly control setting in function a cleaning sub-assembly control correlation function which comprises a correlation between said at least one separate cleaning sub-assembly control setting and said at least one further separate cleaning sub-assembly control setting.

In this way the complexity of determining an optimal setting for multiple separate control settings is reduced. In an embodiment in which the sub-assembly control settings are inputted manually by the operator of the harvesting machine, this reduces the number of settings that must be input by the operator. Furthermore this also reduces the need for the operator to determine optimal values for all the separate settings individually as the correlation function is able to calculate optimal values for some of the settings from an optimal value of another setting by means of the correlation function. The same holds for an embodiment in which the control settings are provided automatically, for example in function of values provided by suitable sensors. The control system can then make use of existing algorithms for optimizing one of the cleaning sub-assemblies and rely on the correlation function for optimizing control of a further cleaning sub-assembly. This correlation might be efficiently implemented as a suitable mathematical relation or a lookup table that provides a relation between optimal values for separate cleaning sub-assembly control settings of the multiple cleaning sub-assemblies at varying harvesting conditions.

According to a further embodiment of the invention the control system is configured to:

receive from inputs and/or sensors, separate operational input parameters each associated with a corresponding one of the multiple cleaning sub-assemblies, the operational input parameters comprising for each of the cleaning sub-assemblies at least one value representative of:

the composition of the crop mixture;

the grain size;

the share of impurities in the grain;

the amount or composition of crop material present on the at least one reciprocating sieve of the cleaning sub-assembly;

grain loss at the downstream side of the cleaning sub-assembly;

the amount of rethreshable crop at the downstream side of the cleaning sub-assembly;

the amount of grain provided to the clean grain auger;

the amount and/or distribution of airflow generated by the fan;

calculate the separate cleaning sub-assembly control settings for each of the cleaning sub-assemblies in function of the separate operational input parameters for each of the corresponding sub-assemblies.

This further allows for an increase in user friendliness and improves efficiency of the cleaning assembly as control can be adapted in an automated way to changing harvesting conditions.

According to a further embodiment of the invention the control system is further configured to calculate the cleaning sub-assembly control correlation function in function of the separate operational input parameters for each of the sub-assemblies.

By adapting the correlation function in function of the actual harvesting conditions as detected by means of the operational input parameters a further increase in efficiency of the operation of the cleaning system can be accomplished.

According to a further embodiment the control system is coupled to the fans of each of the cleaning sub-assemblies and operable to control the rotational speeds of the fans of each of the cleaning sub-assemblies in function of separate fan control settings for each of the fans.

According to a further embodiment the cleaning sub-assembly control setting correlation module comprises a fan control setting correlation module operable to:

receive at least one separate fan control setting;

calculate at least one further separate fan control setting from the received separate fan control setting in function a fan control correlation function.

In this way the distribution of the airflow along the direction of the crop flow can be controlled.

According to a further embodiment the control system is coupled to the sieve assemblies of each of the cleaning sub-assemblies and operable to control the operation of the sieve assemblies of each of the cleaning sub-assemblies in function of separate sieve control settings for each of the sieve assemblies.

This allows for adapting the operation of the sieves to changing conditions in the cleaning assembly along the direction of the crop flow.

Optionally the separate sieve control settings each comprise one or more of the following:
- a reciprocation frequency setting;
- a reciprocation phase setting;
- a reciprocation stroke setting.

This allows for adapting the reciprocation to an optimal configuration adapted to the behaviour of the crop material at the height of the different cleaning sub-assemblies.

According to a further embodiment:
the sieve assemblies each comprise at least one reciprocating sieve operable to reciprocate both along and transverse to the direction of the crop flow in function of a reciprocation angle setting; and
the separate sieve control settings each comprise a reciprocation angle setting.

This allows to cope in an optimal way with the effects of a harvester travelling along a side slope to the specific mixture and amount of the crop material at the height of the different cleaning sub-assemblies.

According to a further embodiment:
the sieve assemblies each comprise at least one reciprocating sieve operable to set an opening degree in function of a sieve opening setting; and in that
the separate sieve control settings each comprise a sieve opening setting.

In this way the cleaning system can optimally adapt to variations in the size of impurities that arise along the direction of the crop flow.

According to a further embodiment the cleaning sub-assembly control setting correlation module comprises a sieve control setting correlation module operable to:
receive at least one separate sieve control setting;
calculate at least one further separate sieve control setting from the received independent sieve control setting in function a sieve control correlation function.

This increases user friendliness in a system in which the sieve control settings are provided manually by the operator and allows for a simple setup of an automatic control system for the cleaning system.

According to a preferred embodiment of the invention the sieve assemblies each comprise multiple reciprocating sieves.

In this way a reliable high quality cleaning operation can be obtained in all cleaning sub-assemblies.

According to a further embodiment of the invention:
the first one of the multiple sieve assemblies comprises a reciprocating first upper sieve and a reciprocating first lower sieve arranged below the first upper sieve; and
the second one of the multiple sieve assemblies comprises a reciprocating second upper sieve and a reciprocating second lower sieve arranged below the second upper sieve.

Such an embodiment of the sieve assemblies allows for a qualitative cleaning action as the cleaned grain needs to pass through both the upper and lower sieve which can be specifically adapted to the share of material other than grain in the crop mixture travelling along them.

Preferably:
the first upper sieve is operable to reciprocate in counter-phase with the first lower sieve;
the second upper sieve is operable to reciprocate in counter-phase with the second lower sieve; and
the first upper sieve is operable to reciprocate in phase with the second upper sieve.

This allows for a setup of the sieve assemblies that produces a minimum of vibrations as a consequence of the reciprocating movement of the sieve assemblies.

According to an advantageous embodiment the control system is configured to:
operate the second cleaning sub-assembly in a whirl-layer-phase state, in which the distribution of the air flow and crop material along the second sieve assembly results in an optimal grain separation and optimal grain loss at the downstream end of the second cleaning sub-assembly;
operate the first cleaning sub-assembly in a flight-phase state, in which the grain loss at the downstream end of the first cleaning sub-assembly and the amount of grain that is airlifted from the first cleaning sub-assembly is higher when compared to the whirl-layer-phase state.

It has been found that the second cleaning sub-assembly can be operated most efficiently, by operating it in the whirl-layer-phase, in which an optimal grain cleaning action is effected on the associated sieve area and resulting in only minimal grain losses at the downstream end of this second cleaning sub-assembly, when the first cleaning sub-assembly is operated in the flight-phase state, which was referred to as sub-optimal in the prior art.

According to a second aspect of the invention there is provided a method of operating the cleaning assembly according to the first aspect of the invention, characterised in that the control system controls the operation of each of the cleaning sub-assemblies in function of separate cleaning sub-assembly control settings for each of the cleaning sub-assemblies.

DETAILED DESCRIPTION OF EMBODIMENT(S)

Figure 1:
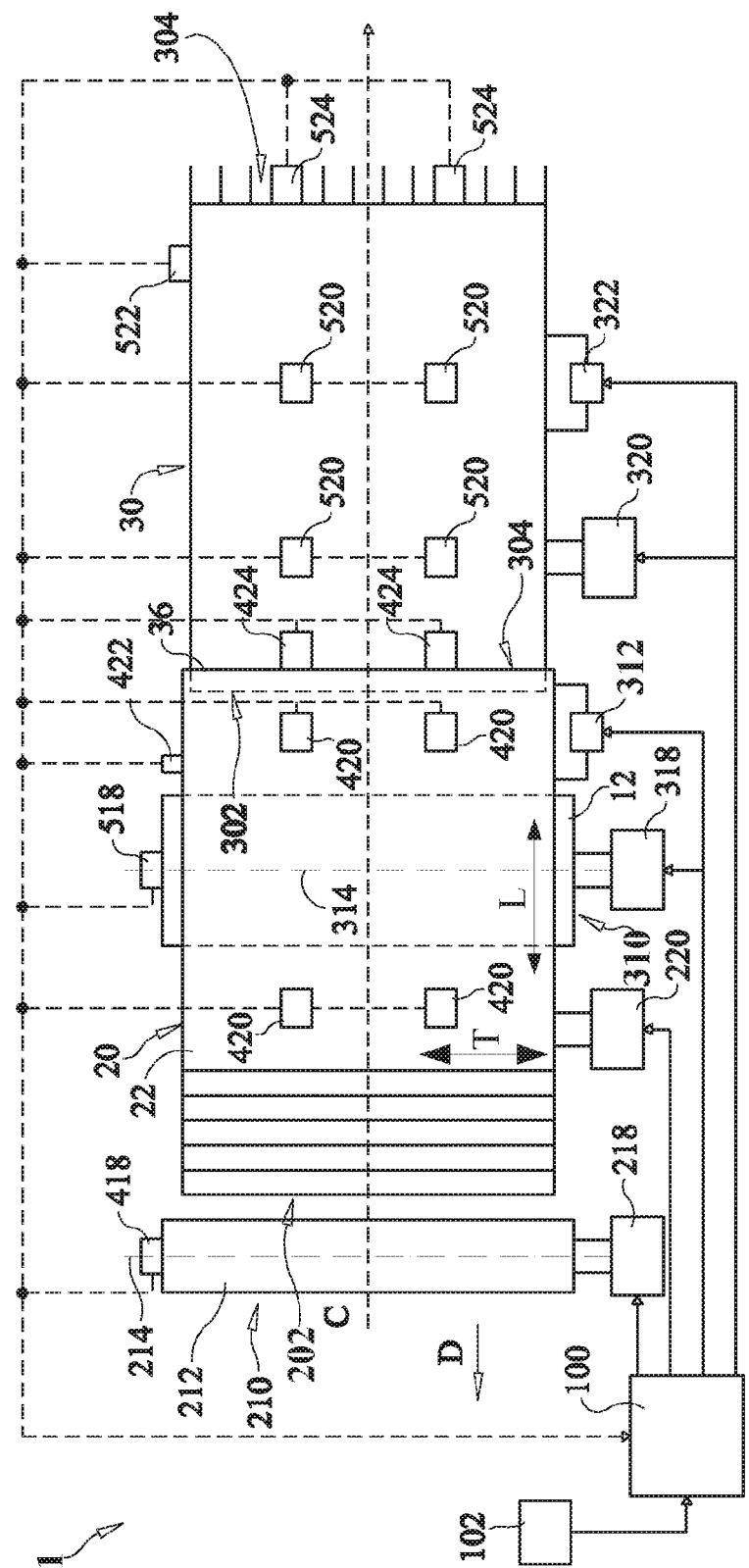
FIG. 1 schematically illustrates a top view of the cleaning assembly according to the invention.
Figure 2:
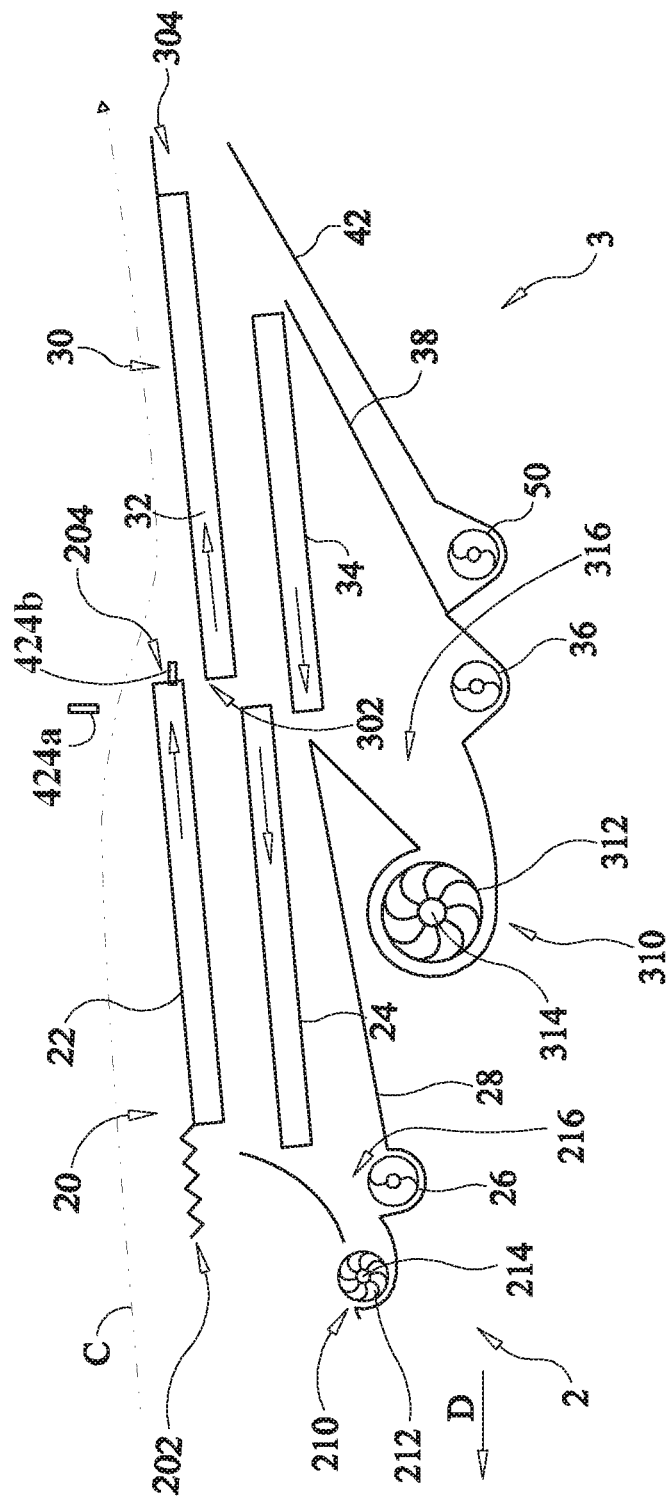
FIG. 2 schematically shows a side view of the embodiment of FIG. 1.

An embodiment of the cleaning assembly 1 for a harvester according to the invention is schematically shown in FIGS. 1 and 2. The cleaning assembly 1 in use, when part of a harvester, for example a combine harvester or any other suitable harvester, performs the cleaning operation during a harvesting operation of the harvester. During such a harvesting operation the harvester generally travels along a driving direction D on field comprising the crop that needs to be harvested. The harvester processes the harvested crop generally along a direction of the crop flow that, as shown is for example a direction opposite to the direction of travel of the harvester. This means that, for example, crop cut by a header of a combine harvester is moved by a feeder to a threshing and/or separation unit where the grain is removed from the stalk and subsequently moved to and processed by the cleaning assembly 1 along the direction of the crop flow C opposing the driving direction D. The cleaning assembly 1 shown in FIGS. 1 and 2 comprises two separate cleaning sub-assemblies 2, 3. During a cleaning operation the crop is received by a first cleaning sub-assembly 2 at an upstream end 202 of its sieve assembly 20 and subsequently transported along the crop flow direction C to a downstream end 204. As shown the first cleaning sub-assembly 2 in this way extends along the direction of the crop flow C along its longitudinal direction L. Its dimensions along the crop flow direction C could thus be referred to as its length and its dimensions transverse to this direction along the transversal direction T as its width. The first cleaning sub-assembly 2 comprises a fan 210 comprising a suitable housing in which cylindrical fan elements 212 rotate along a rotational axis 214 generally transverse to the direction of the crop flow C so that a flow of air is generated at a fan outlet 216 near the upstream end 202 of the sieve assembly 20 of this first cleaning sub-assembly 2. As shown this sieve assembly 20 comprises two reciprocating sieves 22, 24 of which the upstream end 202 is arranged near the fan outlet 216. In this way the flow of air output by the fan outlet 216 will generally flow along the sieve assembly 20 from its upstream end 202 to its downstream end 204 along the direction of the crop flow C, especially when viewed in the top view as shown in FIG. 1. In the side view of FIG. 2 the air flow will also have an upwards component in order to flow from the fan outlet 216 from the underside of the reciprocating sieves 22, 24 to their upper side. Crop material will in this way be cleaned by the first reciprocating upper sieve 22 and subsequently the first reciprocating lower sieve 24 such that impurities and chaff will be transported to the downstream end 204 of the first sieve assembly 20 and cleaned grain will fall through the reciprocating sieves 22, 24 under the action of gravity on an inclined clean grain return pan 28. The cleaned grain will flow generally against the direction of the crop flow C along the inclined clean grain return pan 28 towards a clean grain auger 26 arranged below the sieve assembly 20. The received cleaned grain from the sieve assembly 20 accumulated at the clean grain auger 26 can then for example be transported towards a grain tank of the harvester.

At the downstream end 204 of the first cleaning sub-assembly 2 there is arranged a second cleaning sub-assembly 3 in a sequential way with respect to the direction of the crop flow. This means that the crop flow continues from the downstream end 204 of the first cleaning sub-assembly 2 to the upstream end 302 of a sieve assembly 30 of the second cleaning sub-assembly 3. The elements of the second cleaning sub-assembly 3 are largely similar to that of the first cleaning sub-assembly 2. A fan 310 comprises suitable cylindrical fan elements 312 rotatable around a rotational axis 314 and cooperating with a suitable housing to provide an airflow at a fan outlet 316 near the upstream end 302 of the sieve assembly 30. As shown the reciprocating sieve assembly 30 comprises a second upper sieve 32 and a second lower sieve 34 receiving crop material from the first upper sieve 22 and the first lower sieve 24 respectively and transporting it to the downstream end 304 of the second sieve assembly 30. Cleaned grain passing through the sieves 32, 34 falling on an inclined grain pan feeding it to a clean grain auger 36. As shown in the embodiment of FIGS. 1 and 2 the second cleaning sub-assembly 30 further comprises an optional inclined rethreshable grain pan 42 for feeding rethreshable material such as for example tailings and other not sufficiently threshed crop material as a return flow to an auxiliary threshing unit 50 after which the rethreshed crop material can be fed back to the upstream end of the cleaning assembly 1 for a further cleaning operation.

It is clear that although the embodiment shown in FIGS. 1 and 2 shows a cleaning assembly comprising two sequentially arranged cleaning sub-assemblies, according to alternative embodiments there could be provided three, four or more cleaning sub-assemblies arranged in a sequential fashion along the direction of the crop flow C.

As will be explained in further detail below the cleaning assembly of the embodiment of FIGS. 1 and 2 also comprises a control system 100 coupled to each of the cleaning sub-assemblies 20, 30. As shown this control system 100 is for example coupled to respective fan drives 218, 318 operable to control the rotational speed of the fans 210, 310, sieve drives 220, 320 operable to control the reciprocation of the sieve assemblies 20, 30 and sieve opening actuators 222, 322 operable to control the opening degree of the sieves 22, 24, 32, 34 of each of the two cleaning sub-assemblies 2, 3. It is clear that according to alternative embodiments the control system 100 might be coupled to suitable drives or actuators for controlling the operation of each of the cleaning sub-assemblies 2, 3. The control system 100 provides a suitable signal for controlling each of the cleaning sub-assemblies 20, 30 in function of separate cleaning sub-assembly control settings. These separate cleaning sub-assembly control settings 112, 113 in this way allow an optimal control of the cleaning operation tuned to the specific requirements in the different zones covered by each of the sequentially arranged cleaning sub-assemblies 2, 3 along the direction of the crop flow C. The separate cleaning sub-assembly control settings 112, 113 could for example be received from a suitable input device 102 available to an operator of the harvesting machine in which the operator could for example input separate cleaning sub-assembly control settings 112, 113 such as separate settings for the rotational speed of each of the fan drives 218, 318; separate settings for the each of the sieve drives 220, 320, separate settings for each of the sieve opening actuators 222, 322, etc. As an example, when harvesting wheat, the rotational speed of the first fan 210 could be set to achieve an air flow of about 4 m/s, while the rotational speed of the second fan 310 could be set to achieve a lower air flow of about 3 m/s. The resulting distribution of the airflow along the longitudinal direction L of the cleaning assembly 1 is shown schematically in FIG. 6. The airflow speed profile at the height of the first sieve assembly 20, referred to as v20, shows the airflow generated by the first fan 210 of the first cleaning sub-assembly 2. The airflow speed profile at the height of the second sieve assembly 30 referred to as v30 shows the airflow generated by the second fan 310. R20 shows the optimal range for the airflow along the first sieve assembly 20. This optimal range R20 reaches for example from 2 m/s to 4 m/s. If the airflow is higher than this optimal range, then the share of grain that is airlifted from the first cleaning sub-assembly 20 will start to rise. If the airflow is too low then the share of impurities like chaff that is not sufficiently airlifted will start to rise, leading to an increase in the amount of material other than grain that is present on the first cleaning sub-assembly 2 and passing through the first sieve assembly 20 to the clean grain auger 26. This mix of crop material will lead to a less efficient grain extraction and increase the amount of impurities present with the cleaned grain. R30 shows the optimal range for the airflow along the second sieve assembly 30. This optimal range R30 reaches for example from 1 m/s to 3 m/s.

In another example, when harvesting corn, the rotational speed of the fan 210 could be set to produce an airflow of about 5 m/s and the second fan 310 to produce an air flow of about 4 m/s. In still a further example, when harvesting Canola the air flow of the first fan 210 could be set to about 1 m/s, while that of the second fan 310 is set to about 2 m/s, which for example corresponds to the airflow distribution shown schematically in FIG. 7. It is clear that such an airflow distribution could not be realised with a prior art system as there generally the airflow always decreases from the upstream side of the cleaning assembly to the downstream side.

Figure 6:
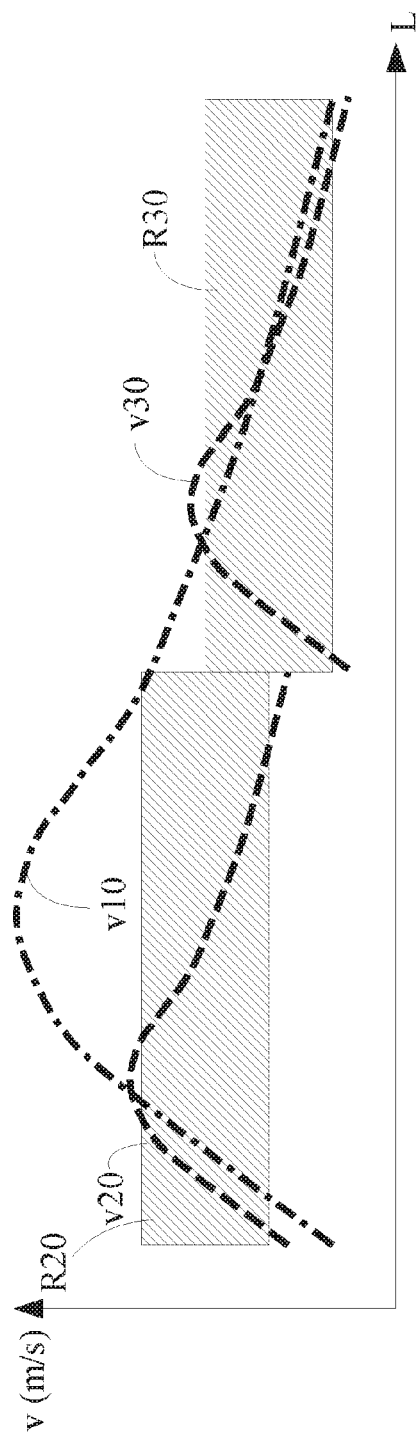
FIGS. 6 and 7 schematically illustrate the distribution of the airflow along the longitudinal direction of the cleaning assembly of FIGS. 1 and 2.
Figure 7:
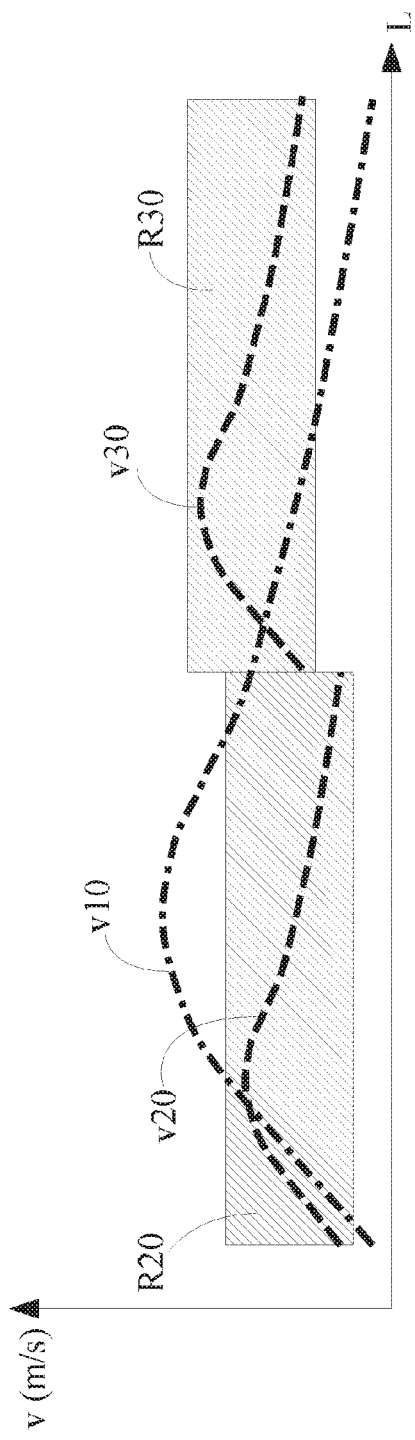

Additionally, as is clear from the airflow distribution schematically represented in FIGS. 6 and 7, the airflow speed profiles v20, v30 of the cleaning assembly 1 according to the invention are able to remain in the optimal ranges R20, R30, far better than would have been possible with a comparable airflow speed profile v10 generated by a prior art cleaning assembly comprising a single fan assembly. Furthermore the maximum amount of airflow that must be generated for attaining the airflow speed profiles v20, v30 can remain considerably lower than that necessary for generating the v10 airflow speed profile, such that not only a more optimal cleaning operation can be realised, but additionally this can be accomplished in a way that allows a reduction of the energy consumption, especially of the fan assembly.

Figure 3:
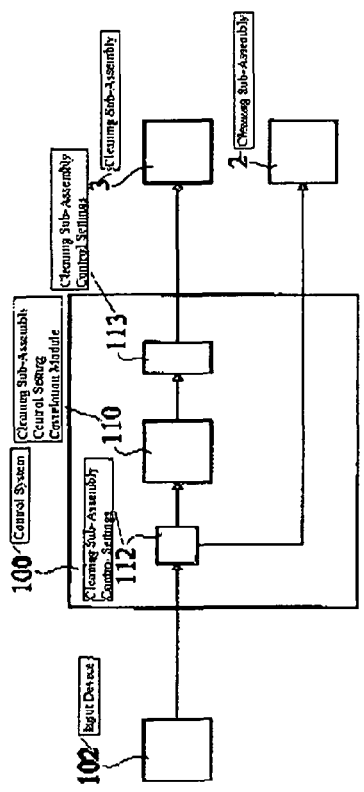
FIGS. 3 to 5 schematically show alternative embodiments of the control system for the embodiment of FIGS. 1 and 2.

According to a further embodiment as shown in FIG. 3, the control system 100 comprises a cleaning sub-assembly control setting correlation module 110. This cleaning sub-assembly control setting correlation module 110 calculates upon reception of a first separate cleaning sub-assembly control setting 112 for the first cleaning sub-assembly 2, for example from the input device 102, the second separate cleaning sub-assembly control setting 113 for the second cleaning sub-assembly 3 by means of a cleaning sub-assembly control correlation function. Such a cleaning sub-assembly control correlation function can define a suitable correlation by means of a mathematical relation between the separate cleaning sub-assembly control settings 112, 113 or alternatively by means of a suitable look-up table or any other suitable way. In this way the complexity of determining an optimal setting for both separate control settings 112, 113 is reduced and an operator only needs to determine an optimal setting for the first separate cleaning sub-assembly control setting 112 and can subsequently rely on the correlation module 110 to determine an optimal value for the second separate cleaning sub-assembly control setting.

As already mentioned above according to the embodiment of FIGS. 1 and 2, the control system 100 is coupled to the fans 210, 310 of each of the cleaning sub-assemblies 20, 30 by means of their fan drives 218, 318 which allow to control the rotational speeds of these fans 212, 312 in function of separate sub-assembly control settings 112, 113 each comprising corresponding separate fan control settings. These separate fan control settings are then for example able to determine the rotational speeds of each of the fans separately. According to the embodiment of FIG. 3 the control setting correlation module 110 is then for example able to calculate the fan speed for the fan of the second cleaning sub-assembly 3 in function of the fan speed for the fan of the first cleaning sub-assembly by means of the correlation module 110 comprising a suitable fan correlation function. This fan correlation function could for example determine a mathematical relation between the two fan speeds, such as for example determining a relationship that determines the fan speed of the fan of the first cleaning sub-assembly 2 by increasing or decreasing the fan speed of the fan of the second cleaning sub-assembly 3 with a certain percentage. It is clear that alternative correlation methods are possible such as for example the use of a lookup table.

As further shown in the embodiment of FIGS. 1 and 2 the control system 100 is also coupled to the sieve assemblies 20, 30 by means of their sieve drives 220, 230. This allows for control of the operation of the sieves assemblies 20, 30. This means that for example the reciprocation frequency, phase or stroke of both sieve assemblies 20, 30 can be set in function of separate sub-assembly control settings comprising separate sieve control settings. This is especially useful when, as known from for example EP1609352 and EP1889533, the sieve assemblies 20, 30 comprise a sieve drive 220, 230 that is able to reciprocate the sieves 22, 24, 32, 34 both along and transverse to the direction of the crop flow (C) in function of a reciprocation angle setting for example to compensate for the distribution of the crop on the sieves when the harvester is travelling on a sidewards slope. In such a case the separate sieve control settings can for example each comprise a separate reciprocation angle setting that determines the amount of reciprocation of the sieves transverse to the direction of the crop flow. As the composition of the crop on the sieves of the first cleaning sub-assembly 2 will be different from that on the second cleaning sub-assembly 3 the amount of transverse reciprocation can thus accordingly be adapted.

Still further shown in the embodiment of FIGS. 1 and 2, the control system 100 is further coupled to a sieve opening actuator 222, 322 of each of the cleaning sub-assemblies 2, 3. When the separate sub-assembly control settings 112, 113 comprise for each of these actuators a sieve control setting that comprises a sieve opening setting, the opening degree of the reciprocating sieves 22, 24, 32, 34 can be set optimally in order to adapt the airflow and openings for cleaned grain traversing the sieves to the specific conditions arising at the height of each of the cleaning sub-assemblies 2, 3. It is clear that also here according to the embodiment of FIG. 3, for example the sieve opening setting for the sieves of the second cleaning sub-assembly 3 can be calculated from the sieve opening setting for the sieves of the first cleaning sub-assembly 2 by means of the correlation module 110 in function of a suitable sieve opening correlation function. As an example, when harvesting wheat, the opening degree of the first upper sieve 22 could be set to a suitable value in the range of 50% to 90%, such as for example 60% or 80% of the maximum opening degree, and the opening degree of the second upper sieve 32 could be set by the correlation module 110 to substantially the same opening degree as the first upper sieve 22. The first lower sieve 24 could in such a situation be set to a suitable value in the range of 10% to 50%, for example 20% or 30%. The correlation module 110 also here could function to set the opening degree of the second lower sieve 34 substantially equal to the opening degree of the first lower sieve 24. In another example, when harvesting corn, also here the correlation module 110 could function to keep the opening degree of the second upper and lower sieves substantially equal to those of the first upper and lower sieves respectively. However here the suitable range of values for the upper sieve would be for example in the range of 80% to 100%, for example 90% or 100%, and the suitable values for the lower sieve would be in the range of 50% to 80%, such as for example 60% or 70%. In still a further example, when harvesting Canola the correlation module 110 could function to keep the opening degree of the second upper sieve 32 to about 10% or 20% higher than that of the first upper sieve 22. The opening degree of the first upper sieve 22 being set to a suitable value in the range of 0% to 30%, for example 0% or 10%. The correlation module 110 for example keeping the opening degree of the second lower sieve 34 substantially the same as that of the first lower sieve 24, to a suitable value of for example a value in the range of 5% to 20%, such as for example 10%.

In order to reduce the vibrations caused by the sieve assemblies the first upper sieve 22 as indicated in FIG. 2 preferably reciprocate in counter-phase with the first lower sieve 24. Similarly the second upper sieve 32 preferably also reciprocates in counter-phase with the second lower sieve 34. Additionally in order to allow for an optimal transfer from the crop material from the downstream end 204 of the first upper sieve 22 to the upstream end 302 of the second upper sieve 32 and from the downstream end 204 of the first lower sieve 24 to the upstream end 302 of the second lower sieve 34 preferably the first upper sieve 22 reciprocates in phase with the second upper sieve 32 and consequently the in counter-phase reciprocating first lower sieve 24 reciprocates in phase with the second lower sieve 34.

Figure 4:
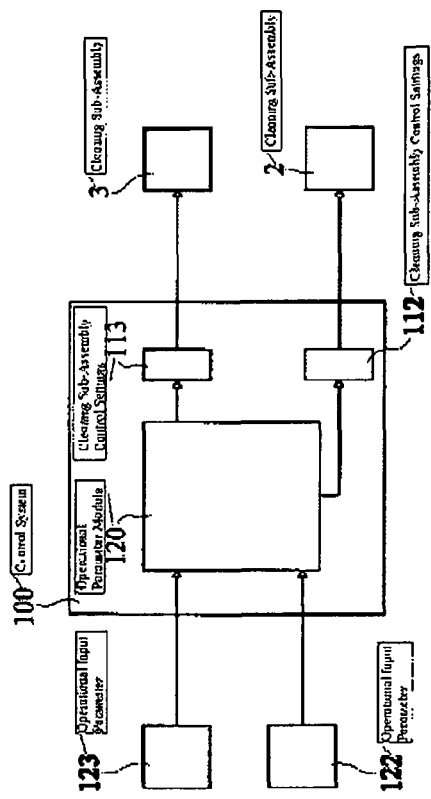

As shown in the embodiment of FIGS. 1 and 2 next to the suitable input means 102 for an operator of the harvester a plurality of sensors is connected to the control system 100. These sensors can measure suitable values for automatically determining separate operational input parameters 122, 123 of both cleaning sub-assemblies 2, 3. As shown there is arranged a sensor 418, 518 for determining the rotational speed of each of the fans 210, 310 which is representative for the amount of air flow generated by these fans 210, 310. Additionally sensors 420, 520 are provided for providing the distribution of the airflow or crop material along the sieve assemblies of the respective cleaning sub-assemblies 2, 3, such as for example generally known from U.S. Pat. No. 4,259,829 (Sperry, 1981) or EP2550852 (Claas, 2013). Further also sensors 422, 522 are provided for determining the sieve opening of the sieves of each of the cleaning sub-assemblies 2, 3. Additionally also grain loss sensors 424, 524 are provided for measuring the amount of grain loss at the downstream end 204, 304 of each of the cleaning sub-assemblies 2, 3. According to the embodiment shown in FIG. 4 the control system 100 can then calculate the separate cleaning sub-assembly control settings 112, 113 for each of the cleaning sub-assemblies 2, 3 in function of the separate operational input parameters 122, 123 for each of the corresponding sub-assemblies 2, 3 as determined by the readings of the sensors by means of a suitable operational parameter module 120. It is clear that alternative to providing these operational input parameters 122, 123 by means of suitable sensors they could alternatively be provided by the operator by means of suitable inputs 102. In addition to the operational input parameters 122, 123 mentioned above it is clear that alternative parameters for each of the cleaning sub-assemblies 2, 3 might be considered such as for example the composition of the crop mixture, for example determined by the share of the material other than grain in the crop mixture, the grain size, the share of impurities in the grain, the amount or composition of crop material present on the at least one reciprocating sieve 22, 24, 32, 34 of each of the cleaning sub-assemblies 2, 3, the amount of rethreshable crop at the downstream side of the cleaning sub-assembly, the amount of cleaned grain provided to the clean grain auger, etc.

Figure 5:
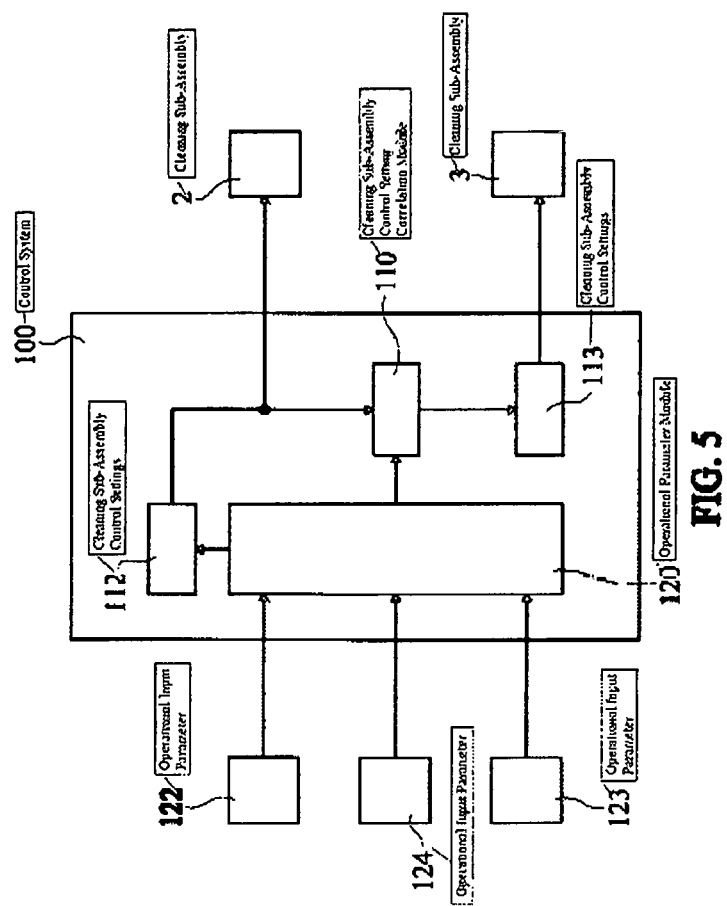

According to still a further embodiment of the control system 100 shown in FIG. 5 the input parameters provided by the sensors or the input means are used by an operational parameter module 120 to calculate sub-assembly control settings 112 for the first cleaning sub-assembly 2 and which are subsequently provided to a correlation module 110 similar as described with reference to the embodiment of FIG. 3 for calculation the sub-assembly control settings 113 for the second cleaning sub-assembly. However in contrast to the embodiment of FIG. 3, here the operational parameter module will also adapt the cleaning sub-assembly control correlation function of the correlation module 110 in function of the separate operational input parameters 122, 124 dynamically still further increasing adaptability of the cleaning assembly 1 to changing conditions during a harvesting operation. Optionally in addition to the separate operational input parameters 122, 123 for each of the cleaning sub-assemblies 2, 3 there can be provided common operational input parameters 124, that can be taken into account by the operational parameter module 120 for both cleaning sub-assemblies 2, 3 in common. This is especially useful when taking into account common operational input parameters such as for example the driving speed of the harvester during a harvest operation or the lateral tilt the entire cleaning module 1.

As known from U.S. Pat. No. 4,259,829 (Sperry, 1981) and EP2550852 (Claas, 2013) in a prior art cleaning assembly there can be provided sensors 420, 520 that detect the distribution of the airflow or crop material along the longitudinal direction of the sieve assemblies. In such prior art cleaning assemblies the control system will function to adjust this measured airflow or crop material distribution along the longitudinal direction of the sieve assemblies to a predetermined optimal airflow or crop material distribution such that the majority of clean grain falls through the sieves over the first two thirds of its length, peaking at about mid-way, such as for example mentioned in U.S. Pat. No. 4,259,829 column 7, lines 28-31, which is generally referred to as the whirl-layer-phase in EP2550852. Such prior art control systems would thus be configured to adjust the operation of the cleaning assembly to this optimal air flow or crop material distribution, thereby avoiding operational states, which are less optimal, such as when the airflow is too low or the layer of crop material is too thick, generally referred to as the cover phase or when the airflow is too high or the layer of crop material too thin, generally referred to as the flight phase. In both these latter operational states the amount grain falling through the sieves peaks further to the downstream end of the sieves and at this downstream end of the sieves the grain losses increases with respect to the predetermined optimal airflow or crop material distribution, such as for example clearly shown in FIG. 2 of EP2550852.

An advantageous mode of operation of the cleaning assembly according to the invention has been found that considerably diverts from this prior art mode of operation. It has been found that in order for the second cleaning sub-assembly 3 to operate most efficiently, by operating it in the whirl-layer-phase, in which an optimal grain cleaning action is effected on the associated sieve area and resulting in only minimal grain losses at the downstream end of this second cleaning sub-assembly 3, it is beneficial to operate the first cleaning sub-assembly 2 the flight-phase state, which was referred to as sub-optimal in the prior art. By operating the first cleaning sub-assembly 2 in the flight phase state, the grain loss at the downstream end of the first cleaning subassembly will increase as the peak of the grain separation will shift further to the downstream end of the first sieve assembly 20. Additionally also the amount of grain that is airlifted from the first sieve assembly 20 will increase. However these effects turn out to be beneficial for the crop material distribution on the second sieve assembly 30 in order to operate it in the optimal whirl-layer—phase state as a sufficient amount and optimal mix of grain resulting from grain loss falling from the downstream end of the first sieve assembly 20 and grain airlifted from the first sieve assembly 20, both being distributed on the second sieve assembly 30 surprisingly provide for an optimal operation of the cleaning assembly 1 according to the invention. It is thus advantageous for the control system 100 to operate the first cleaning sub-assembly 2 in the flight—phase state and the second cleaning sub-assembly 3 in the whirl-layer-phase state. According to an embodiment the control system 100 can implement such a control scheme by comparing measurements of the sensors 420, 520 that are provided for measuring the profile of the distribution of the airflow or crop material along the sieve assemblies of the respective cleaning sub-assemblies 2, 3, with a first flight-phase reference profile for the first cleaning sub-assembly 2 and a second whirl-layer-phase reference profile for the second cleaning sub-assembly 3, making necessary adjustments to the operation of both cleaning sub-assemblies 2, 3 in order to reduce any differences between the reference profiles and the measured profiles of the distribution of the airflow or crop material along the sieve assemblies.

According to an advantageous embodiment the amount of airborne grain and/or the amount of grain loss at the downstream end of the first sieve assembly 20 is monitored by the control system 100. This could be done by means of the sensors 520 that measure the distribution of crop material on the second sieve assembly 30 or alternatively by suitable grain loss sensors 424 arranged at the downstream end of the first sieve assembly 20. The grain loss sensor 424a for detecting the air lifted grain could be arranged at a certain distance above the upper surface of the first sieve assembly 20. The grain lass sensor 424b for detecting grain loss of grain falling down at the downstream end of the first sieve assembly 20, can be arranged lower, for example just below the upper surface of the first sieve assembly 20. These sensor measurements are then used by the control system 100 to control the flight-phase state at the first sieve assembly 20, such that an optimal crop and air flow distribution results at the second sieve assembly 30.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A cleaning assembly for a harvester operable to clean a crop while moving along a direction of the crop flow and comprising:
   multiple cleaning sub-assemblies, each comprising:
      a fan for generating a flow of air at a fan outlet;
      a sieve assembly comprising at least one reciprocating sieve extending along the direction of the crop flow between an upstream end and a downstream end, the upstream end arranged near the fan outlet such that the flow of air output by the fan outlet generally flows along the sieve assembly and the direction of the crop flow; and
      a clean grain auger arranged below the sieve assembly and operable to receive cleaned grain from the sieve assembly,
   the downstream end of a first one of the multiple cleaning sub-assemblies being arranged at the upstream end of a second one of the multiple cleaning sub-assemblies,
   a control system coupled to each of the cleaning sub-assemblies and operable to separately control operation of each of the cleaning sub-assemblies as a function of separate cleaning sub-assembly control settings for each of the cleaning sub-assemblies;
   wherein the control system comprises a cleaning sub-assembly control setting correlation module operable to:
   receive at least one separate cleaning sub-assembly control setting;
   calculate at least one further separate cleaning sub-assembly control setting from the received separate cleaning sub-assembly control setting as a function of a cleaning sub-assembly control correlation function which comprises a correlation between said at least one separate cleaning sub-assembly control setting and said at least one further separate cleaning sub-assembly control setting.

2. A cleaning assembly according to claim 1, wherein the control system is configured to:
   receive from at least one of inputs and sensors, separate operational input parameters each associated with a corresponding one of the multiple cleaning sub-assemblies, the operational input parameters comprising for each of the cleaning sub-assemblies at least one value representative of:
      the composition of the crop mixture;
      the grain size;
      the share of impurities in the grain;
      the amount or composition of crop material present on the at least one reciprocating sieve of the cleaning sub-assembly;
      grain loss at the downstream side of the cleaning sub-assembly;
      the amount of rethreshable crop at the downstream side of the cleaning sub-assembly;
      the amount of grain provided to the clean grain auger;
      the amount and/or distribution of airflow generated by the fan;
      the rotational speed of the fan; and
      the sieve opening;
   calculate the separate cleaning sub-assembly control settings for each of the cleaning sub-assemblies as a function of the separate operational input parameters for each of the corresponding sub-assemblies.

3. A cleaning assembly for a harvester operable to clean a crop while moving along a direction of the crop flow and comprising:
   multiple cleaning sub-assemblies, each comprising:
      a fan for generating a flow of air at a fan outlet;
      a sieve assembly comprising at least one reciprocating sieve extending along the direction of the crop flow between an upstream end and a downstream end, the upstream end arranged near the fan outlet such that the flow of air output by the fan outlet generally flows along the sieve assembly and the direction of the crop flow; and
      a clean grain auger arranged below the sieve assembly and operable to receive cleaned grain from the sieve assembly,
   the downstream end of a first one of the multiple cleaning sub-assemblies being arranged at the upstream end of a second one of the multiple cleaning sub-assemblies,
   a control system coupled to each of the cleaning sub-assemblies and operable to separately control operation of each of the cleaning sub-assemblies as a function of separate cleaning sub-assembly control settings for each of the cleaning sub-assemblies;
   wherein the control system is configured to:
      receive from at least one of inputs and sensors, separate operational input parameters each associated with a corresponding one of the multiple cleaning sub-assemblies, the operational input parameters comprising for each of the cleaning sub-assemblies at least one value representative of:
         the composition of the crop mixture;
         the grain size;
         the share of impurities in the grain;
         the amount or composition of crop material present on the at least one reciprocating sieve of the cleaning sub-assembly;
         grain loss at the downstream side of the cleaning sub-assembly;
         the amount of rethreshable crop at the downstream side of the cleaning sub-assembly;
         the amount of grain provided to the clean grain auger;
         the amount and/or distribution of airflow generated by the fan;
         the rotational speed of the fan; and
         the sieve opening;
      calculate the separate cleaning sub-assembly control settings for each of the cleaning sub-assemblies as a function of the separate operational input parameters for each of the corresponding sub-assemblies;
   wherein the control system is further configured to calculate the cleaning sub-assembly control correlation function as a function of the separate operational input parameters for each of the sub-assemblies.

4. A cleaning assembly according to claim 1, wherein the control system is coupled to the fans of each of the cleaning sub-assemblies and operable to control the rotational speeds of the fans of each of the cleaning sub-assemblies as a function of the separate sub-assembly control settings comprising separate fan control settings for each of the fans.

5. A cleaning assembly according to claim 1, wherein the control system is coupled to the sieve assemblies of each of the cleaning sub-assemblies and operable to control the operation of the sieves assemblies of each of the cleaning sub-assemblies as a function of separate sub-assembly control settings comprising separate sieve control settings for each of the sieve assemblies.

6. A cleaning assembly according to claim 5, wherein the separate sieve control settings each comprise one or more of the following:
   a reciprocation frequency setting;
   a reciprocation phase setting;
   a reciprocation stroke setting.

7. A cleaning assembly according to claim 5, wherein
   the sieve assemblies each comprise at least one reciprocating sieve operable to reciprocate both along and transverse to the direction of the crop flow in function of a reciprocation angle setting; and in that
   the separate sieve control settings each comprise a reciprocation angle setting.

8. A cleaning assembly according to claim 5, wherein: the sieve assemblies each comprise at least one reciprocating sieve operable to set an opening degree as a function of a sieve opening setting; and in that
   the separate sieve control settings each comprise a sieve opening setting.

9. A cleaning assembly according to claim 1, wherein the sieve assemblies each comprise multiple reciprocating sieves,
   the first one of the multiple sieve assemblies comprises a reciprocating first upper sieve and a reciprocating first lower sieve arranged below the first upper sieve; and
   the second one of the multiple sieve assemblies comprises a reciprocating second upper sieve and a reciprocating second lower sieve arranged below the second upper sieve.

10. A cleaning assembly for a harvester operable to clean a crop while moving along a direction of the crop flow and comprising:
   multiple cleaning sub-assemblies, each comprising:
      a fan for generating a flow of air at a fan outlet;
      a sieve assembly comprising at least one reciprocating sieve extending along the direction of the crop flow between an upstream end and a downstream end, the upstream end arranged near the fan outlet such that the flow of air output by the fan outlet generally flows along the sieve assembly and the direction of the crop flow; and
      a clean grain auger arranged below the sieve assembly and operable to receive cleaned grain from the sieve assembly,
   the downstream end of a first one of the multiple cleaning sub-assemblies being arranged at the upstream end of a second one of the multiple cleaning sub-assemblies,
   a control system coupled to each of the cleaning sub-assemblies and operable to separately control operation of each of the cleaning sub-assemblies as a function of separate cleaning sub-assembly control settings for each of the cleaning sub-assemblies
   wherein the sieve assemblies each comprise multiple reciprocating sieves, the first one of the multiple sieve assemblies comprises a reciprocating first upper sieve and a reciprocating first lower sieve arranged below the first upper sieve; the second one of the multiple sieve assemblies comprises a reciprocating second upper sieve and a reciprocating second lower sieve arranged below the second upper sieve;
   wherein the first upper sieve is configured for reciprocation in counter-phase with the first lower sieve; the second upper sieve is configured for reciprocation in counter-phase with the second lower sieve; and the first upper sieve is configured for reciprocation in phase with the second upper sieve.

11. A cleaning assembly for a harvester operable to clean a crop while moving along a direction of the crop flow and comprising:
- multiple cleaning sub-assemblies, each comprising:
  - a fan for generating a flow of air at a fan outlet;
  - a sieve assembly comprising at least one reciprocating sieve extending along the direction of the crop flow between an upstream end and a downstream end, the upstream end arranged near the fan outlet such that the flow of air output by the fan outlet generally flows along the sieve assembly and the direction of the crop flow; and
  - a clean grain auger arranged below the sieve assembly and operable to receive cleaned grain from the sieve assembly,
- the downstream end of a first one of the multiple cleaning sub-assemblies being arranged at the upstream end of a second one of the multiple cleaning sub-assemblies;
- a control system coupled to each of the cleaning sub-assemblies and operable to separately control operation of each of the cleaning sub-assemblies as a function of separate cleaning sub-assembly control settings for each of the cleaning sub-assemblies;
- wherein the control system is configured to:
  - operate the second cleaning sub-assembly in a whirl-layer-phase state, in which the distribution of the air flow and crop material along the second sieve assembly results in an optimal grain separation and optimal grain loss at the downstream end of the second cleaning sub-assembly;
  - operate the first cleaning sub-assembly in a flight-phase state, in which the grain loss at the downstream end of the first cleaning sub-assembly and the amount of grain that is airlifted from the first cleaning sub-assembly is higher when compared to the whirl-layer-phase state.

12. A cleaning assembly according to claim 1, wherein the control system controls the operation of each of the cleaning sub-assemblies as a function of separate cleaning sub-assembly control settings for each of the cleaning sub-assemblies.

13. A cleaning assembly for a harvester operable to clean a crop while moving along a direction of the crop flow and comprising:
- multiple cleaning sub-assemblies, each comprising:
  - a fan for generating a flow of air at a fan outlet;
  - a sieve assembly comprising at least one reciprocating sieve extending along the direction of the crop flow between an upstream end and a downstream end, the upstream end arranged near the fan outlet such that the flow of air output by the fan outlet generally flows along the sieve assembly and the direction of the crop flow; and
  - a clean grain auger arranged below the sieve assembly and operable to receive cleaned grain from the sieve assembly,
- the downstream end of a first one of the multiple cleaning sub-assemblies being arranged at the upstream end of a second one of the multiple cleaning sub-assemblies,
- a control system coupled to each of the cleaning sub-assemblies and operable to separately control operation of each of the cleaning sub-assemblies as a function of separate cleaning sub-assembly control settings for each of the cleaning sub-assemblies;
- wherein the control system controls the operation of each of the cleaning sub-assemblies as a function of separate cleaning sub-assembly control settings for each of the cleaning sub-assemblies
- wherein the control system is configured for:
  - receiving at least one separate cleaning sub-assembly control setting;
  - calculating at least one further separate cleaning sub-assembly control setting from the received separate cleaning sub-assembly control setting as a function of a cleaning sub-assembly control correlation function.

14. A cleaning assembly according to claim 12, wherein the control system is configured for:
- receiving from at least one of inputs and sensors, separate operational input parameters each associated with a corresponding one of the multiple cleaning sub-assemblies, the operational input parameters comprising for each of the cleaning sub-assemblies at least one value representative of:
  - the crop type;
  - the grain size;
  - the share of impurities in the grain;
  - the amount or composition of crop material present on the at least one reciprocating sieve of the cleaning sub-assembly;
  - grain loss at the downstream side of the cleaning sub-assembly;
  - the amount of rethreshable crop at the downstream side of the cleaning sub-assembly;
  - the amount of grain provided to the clean grain auger; and
  - the amount and/or distribution of airflow generated by the fan;
- calculating the separate cleaning sub-assembly control settings for each of the cleaning sub-assemblies as a function of the separate operational input parameters for each of the corresponding sub-assemblies.

* * * * *